United States Patent [19]

Boetto

[11] 4,443,140
[45] Apr. 17, 1984

[54] TOOL HOLDER WITH MEANS FOR RADIAL ADJUSTMENT

[76] Inventor: Lorenzo Boetto, Via Chivasso 8, San Mauro Torinese (Turin), Italy

[21] Appl. No.: 347,544

[22] Filed: Feb. 10, 198

[30] Foreign Application Priority Data

Feb. 12, 1981 [IT] Italy ............... 67196 A/81

[51] Int. Cl.³ .............................................. B23B 29/18
[52] U.S. Cl. ....................................... 408/147; 408/714
[58] Field of Search .............. 408/143, 146, 147, 150, 408/180, 714, 183, 185, 187, 188; 409/234; 407/9, 8, 10; 82/36 R

[56] References Cited

U.S. PATENT DOCUMENTS

| 2,243,147 | 5/1941  | Blood ................................. 408/187 |
| 3,007,353 | 11/1961 | Garnett ............................... 408/147 |
| 3,466,952 | 9/1969  | Greenberg .......................... 408/147 |
| 3,496,810 | 2/1970  | Hunt .................................. 82/36 R |
| 3,864,054 | 2/1975  | Exsel ................................. 408/147 |
| 4,053,252 | 10/1977 | Gersch ............................. 408/714 X |
| 4,097,179 | 6/1978  | Gersch ............................. 408/714 X |
| 4,224,846 | 9/1980  | Eysel et al. ...................... 408/180 X |
| 4,351,207 | 9/1982  | Werth, Sr. ....................... 408/714 X |

FOREIGN PATENT DOCUMENTS

| 2441519 | 3/1976  | Fed. Rep. of Germany ...... 408/146 |
| 2228553 | 3/1976  | Fed. Rep. of Germany . |
| 2054165 | 11/1979 | Fed. Rep. of Germany ...... 408/146 |
| 2097303 | 11/1982 | United Kingdom ............... 82/36 R |

Primary Examiner—William R. Briggs
Assistant Examiner—Glenn L. Webb
Attorney, Agent, or Firm—Bernard, Rothwell & Brown

[57] ABSTRACT

The invention relates to a tool-holder for machine tools, particularly boring machines, of the type having a cylindrical body which is traversed by a slot shaped whereby that part of the body which supports the tool is displaceable resiliently relative to the remaining part of the body in a direction perpendicular to the axis of the body. Hydraulic means are provided for effecting the transverse displacement of the tool support part to adjust the position of the tool in a radial direction. According to the invention, these hydraulic means are arranged to exert a substantially uniform pressure to the outer surface of the body of the tool-holder.

4 Claims, 3 Drawing Figures

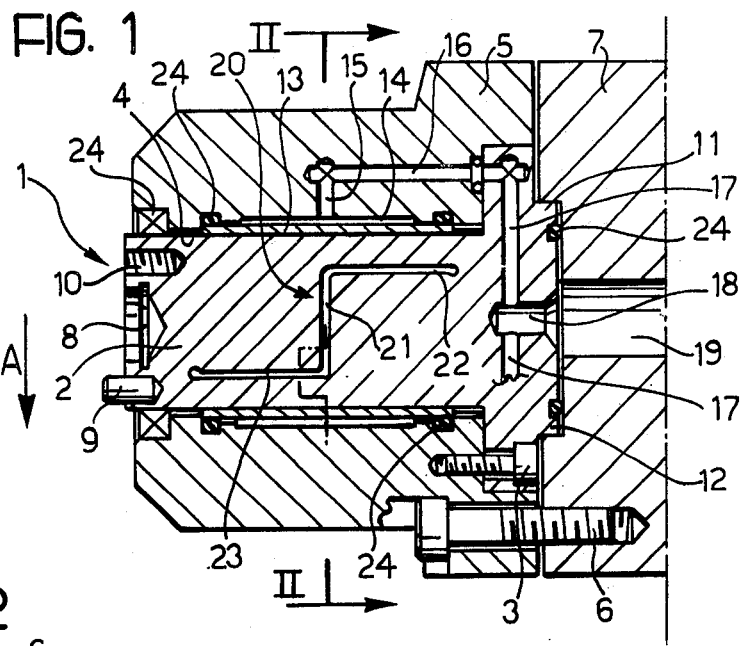
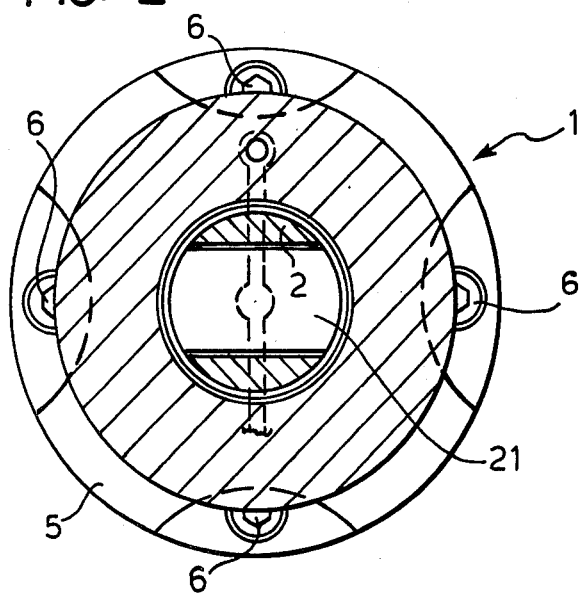
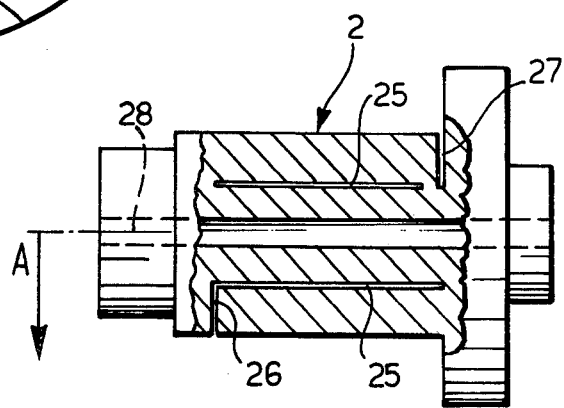

TOOL HOLDER WITH MEANS FOR RADIAL ADJUSTMENT

The present invention relates to tool-holders for machine tools, particularly for boring machines.

The invention is particularly concerned with a tool-holder having a cylindrical body with an axial slot shaped whereby that part of the body which supports the tool is resiliently displaceable relative to the remaining part of the body in a direction perpendicular to the axis of the body, and hydraulic means for effecting transverse displacement of the tool supporting part to adjust the position of the tool in the radial direction.

A tool-holder having these characteristics is described and illustrated in DE-B-2,228,553. This tool-holder has an essentially cup-shaped body provided with a hydraulic cylinder in its internal cavity, which is supplied with fluid under pressure to effect the transverse adjusting displacement of the tool. This known type of tool-holder has, therefore, a relatively complex structure and requires complicated assembly operations.

The problem at the basis of the present invention is that of providing a tool-holder of the type specified above which is formed from a smaller number of parts and can be assembled quickly and easily.

This problem is solved according to the invention by the fact that the hydraulic means are arranged to exert a substantially uniform pressure on the outer surface of the body of the tool-holder.

In a preferred embodiment, the body of the tool-holder is mounted in a cylindrical hole in a support of the tool-holder with the interpositioning of a bush of deformable material, and the wall of the hole defines an annular chamber surrounding the bush, the hydraulic means being arranged to supply fluid under pressure to the annular chamber.

By virtue of these characteristics, the body of the tool-holder according to the invention need not be cup-shaped, and does not require the use of a hydraulic cylinder for effecting the transverse adjusting displacement of the tool.

In a preferred embodiment, the slot passing through the body of the tool-holder comprises a central section which lies in a plane perpendicular to the axis of the body, and two end sections which lie in two parallel planes perpendicular to the direction of transverse adjusting displacement of the tool.

In the known example mentioned above, there are two pairs of transverse, circular section through-holes instead of the end sections of the slot.

The particular above-described shape for the slot in the body of the tool-holder according to the present invention is thus much simpler and more economical to make, without reducing the necessary deformability characteristics of the body of the tool-holder.

In a preferred embodiment, the body of the tool-holder has two main slots which lie in two planes spaced from each other and both perpendicular to the direction of transverse adjusting displacement of the tool, a first auxiliary slot which lies in a plane perpendicular to the axis of the body and extends from that end of one of the main slots which faces the tool support part, and a second auxiliary slot which also lies in a plane perpendicular to the axis of the body and extends adjacent the end of the other main slot which is opposite the tool support part.

By virtue of this characteristic, the slot does not pass through the central part of the body, allowing the formation of an axial hole for the passage of control rods for the tool or for ducting.

Further characteristics and advantages of the present invention will emerge from the description which follows with reference to the appended drawings, in which:

FIG. 1 is a longitudinal sectional view of a tool holder head according to the present invention;

FIG. 2 is a section taken along the line II—II of FIG. 1, and

FIG. 3 illustrates a variant of FIG. 1.

In the drawings, a tool-holder head, generally indicated 1, comprises a cylindrical body 2 fixed by screws 3 within a cylindrical hole 4 in a support 5 which is, in turn, fixed by screws 6 to the body 7 of a spindle of a machine tool with a rotary tool, for example, a boring machine.

The cylindrical body 2 has an end with a central recess 8 for receiving a cooperatingly-shaped appendage which forms part of the support element for the tool. Indicated by 9 is a dowel for the correct angular positioning of the tool, and by 10 is indicated one of the screw-threaded holes for receiving the fixing screws of the element for supporting the tool on the body 2 of the tool-holder head. The opposite end of the body 2 has a cylindrical projection 11 which is housed in a corresponding seat 12 formed in the body of the spindle 7.

The body 2 is fixed in the hole 4 of the support 5 with the interpositioning of a bush of deformable plastics material 13. The wall of the hole 4 defines an annular chamber 14 around the bush 13 which communicates with a plurality of radial ducts 15 formed in the body of the support 5 (only one of the ducts 15 is visible in FIG. 1). Each duct 15 communicates with a corresponding axial duct 16 which is formed in the support 5 and is, in its turn, connected to a radial duct 17 formed in the body 2 of the tool-holder head.

The ducts 17 open into a central chamber 18 which opens at the end of the body 2 facing the spindle, and communicates with a passage 19 formed in the body 7 of the spindle.

The machine tool is provided with means, of a type known per se (not illustrated), for supplying fluid under pressure to the chamber 18 and from there, through the ducts 17, 16, 15 to the annular chamber 14.

The body 2 of the tool-holder head is traversed, perpendicularly to its axis, by a slot 20 which includes a central section 21 lying in a plane perpendicular to the axis of the body 2 and two end sections 22, 23 lying in two parallel planes perpendicular to the plane of the central section 21.

As a result of the presence of the slot 20, the part of the body 2 defined by this slot, which supports the tool, is resiliently displaceable relative to the remaining part of the body 2 in the transverse direction (indicated by the arrow A in FIG. 1) perpendicular to the planes of the end sections 22, 23 of the slot.

The displacement of the part of the body 2 which supports the tool relative to the remaining part of the body in the direction of the arrow A is achieved by supplying fluid under pressure into the annular chamber 14. The pressure exerted by the fluid is distributed uniformly over the surface of the body 2 by means of the bush 13 (which also acts as a sealing element to prevent the fluid from entering the slot 20). As a result of the pressure on the surface of the body 2, the width of the sections 22, 23 of the slot 20 becomes thinner, while the facing surfaces of the central section 21 move relative to each other so as to allow the transverse displacement.

In this way, it is possible to adjust the radial position of the tool, and to correct it during working when necessary because of wear of the tool itself. Thus, it is also possible, by reducing the fluid pressure, to provide for detachment of the tool from the worked surface to avoid scoring during the return stroke.

Sealing washers 24 are interposed between the body 2 and the support 5, and between the body 2 and the body 7 of the spindle.

In the adjusting movement of the tool, the axis of the tool-holder head is constantly maintained parallel to itself.

FIG. 3 illustrates a second embodiment of the cylindrical body 2. In this case, the body 2 includes two main slots 25 which lie in two planes spaced from each other and both perpendicular to the direction A of the adjusting displacement of the tool. Furthermore, there is provided a first auxiliary slot 26 which lies in a plane perpendicular to the axis of the body 2 and extends from that end of one of the two main slots 25 facing the tool support part, and a second auxiliary slot 27 which also lies in a plane perpendicular to the axis of the body 2 and extends adjacent the end of the other main slot 25 which is opposite the tool support part.

As a result of the arrangement described, the slot in the variant of FIG. 3 does not pass through the central part of the body 2, allowing an axial hole 28 to be formed for the passage of control rods for the tool and-/or for ducting.

Naturally, while the principle of the invention remains the same, the details of the construction and the forms of embodiment may be varied widely from that described and illustrated purely by way of example, without departing from the scope of the present invention.

I claim:

1. A tool-holder for machine tools, particularly boring machines, of the type having: a cylindrical body with a part which supports a tool; at least one slot defined by said body and shaped so that said part of the body which supports the tool is displaceable resiliently relative to the remaining part of the body in a direction perpendicular to the axis of the body, and hydraulic means for effecting the transverse displacement of said tool support part to adjust the radial position of the tool, the improvement comprising; said hydraulic means includes passage means arranged so as to provide a supply of fluid under pressure into an annular chamber and distributing the pressure in order to exert a substantially uniform pressure over the outer surface of said body.

2. A tool-holder as defined in claim 1, wherein said slot comprises a central section which lies in a plane perpendicular to the axis of the body, and two end sections which lie in two planar parallel planes perpendicular to the direction of the transverse adjusting displacement of the tool.

3. A tool-holder as defined in claim 1, wherein said tool-holder includes a support defining a cylindrical hole and said cylindrical body is mounted in said hole with the interpositioning of a bush of deformable material, and wherein said hole defines an annular chamber surrounding said bush into which said hydraulic means are arranged to supply fluid under pressure.

4. A tool-holder as defined in claim 1, wherein said body has two main slots which lie in two planes spaced from each other and both perpendicular to the direction of the transverse adjusting displacement of the tool; a first auxiliary slot which lies in a plane perpendicular to the axis of the body and extends from that end of one of the main slots facing said tool support part, and a second auxiliary slot which also lies in a plane perpendicular to the axis of the body and extends adjacent the end of the other main slot which is opposite said tool support part.

* * * * *

UNITED STATES PATENT AND TRADEMARK OFFICE
CERTIFICATE OF CORRECTION

PATENT NO. : 4,443,140
DATED      : April 17, 1984
INVENTOR(S) : Lorenzo Boetto

It is certified that error appears in the above-identified patent and that said Letters Patent is hereby corrected as shown below:

Column 4, Claim 2, line 18, after "two" and before "end"

insert --planar--;

Column 4, Claim 2, line 19, after "two" and before "parallel"

delete --planar--.

Signed and Sealed this

Nineteenth Day of February 1985

[SEAL]

*Attest:*

DONALD J. QUIGG

*Attesting Officer*  *Acting Commissioner of Patents and Trademarks*